(12) United States Patent
DeWitt

(10) Patent No.: US 10,874,059 B2
(45) Date of Patent: Dec. 29, 2020

(54) WATER SPRINKLER FOR SPRAYING A SELECT DEPTH OF WATER PER UNIT AREA ONTO ONE OR A GROUP OF GROUND AREAS OF ANY SHAPE AND RELATIVE SIZE

(71) Applicant: Robert E. DeWitt, Oswego, IL (US)

(72) Inventor: Robert E. DeWitt, Oswego, IL (US)

( * ) Notice: Subject to any disclaimer, the term of this patent is extended or adjusted under 35 U.S.C. 154(b) by 94 days.

(21) Appl. No.: 16/241,733

(22) Filed: Jan. 7, 2019

(65) Prior Publication Data

US 2019/0133059 A1 May 9, 2019

Related U.S. Application Data

(62) Division of application No. 13/750,533, filed on Jan. 25, 2013, now abandoned.

(60) Provisional application No. 61/591,081, filed on Jan. 26, 2012.

(51) Int. Cl.
| | |
|---|---|
| *A01G 25/16* | (2006.01) |
| *B05B 12/12* | (2006.01) |
| *B05B 3/04* | (2006.01) |
| *B05B 15/74* | (2018.01) |
| *B05B 12/04* | (2006.01) |

(52) U.S. Cl.
CPC ............ *A01G 25/16* (2013.01); *B05B 3/0454* (2013.01); *B05B 12/124* (2013.01); *B05B 15/74* (2018.02); *B05B 12/04* (2013.01)

(58) Field of Classification Search
CPC ... B05B 1/28–326; B05B 3/003; B05B 3/021; B05B 3/0418–0459; B05B 12/04; B05B 12/124; B05B 15/10; B05B 15/70; B05B 15/74; A01G 25/00; A01G 25/16
USPC ..... 239/1, 11, 97, 201–206, 240–242, 581.1, 239/DIG. 1
See application file for complete search history.

(56) References Cited

U.S. PATENT DOCUMENTS

| | | | | |
|---|---|---|---|---|
| 3,854,664 | A * | 12/1974 | Hunter | ............... B05B 15/74 239/206 |
| 4,019,686 | A * | 4/1977 | Palma | ............... B05B 1/30 239/205 |
| 2006/0192029 | A1* | 8/2006 | Grizzle | ............... B05B 1/262 239/205 |

(Continued)

*Primary Examiner* — Cody J Lieuwen
(74) *Attorney, Agent, or Firm* — Neal, Gerber & Eisenberg LLP

(57) ABSTRACT

A sprinkler system for lawns and landscaping is custom-fitted to each particular lot or area to be irrigated. Each in-ground, pop-up, rotating sprinkler head has a pattern defining plate fitted therein having a central opening made therein, as by laser cutting, solid particle deposition, or the like, the opening being congruent with the area to be watered, as adjusted for any sloped portions of the area. A pattern sampling aperture aligned with spray nozzles of the sprinkler rotates about the opening in the defining plate, feeding an amount of water to each radial line of the area about the sprinkler sufficient to reach from the sprinkler position out to the periphery. A speed control comprising a spring-biased cam and an opposing turbine wheel in the water flow slows spray head rotation at arc portions of longer water throw and speeds rotation where the throw is shorter, thus to obtain substantially uniform water coverage over all parts of the area served by each sprinkler head.

20 Claims, 7 Drawing Sheets

(56) References Cited

U.S. PATENT DOCUMENTS

| | | | |
|---|---|---|---|
| 2007/0007364 A1* | 1/2007 | Gregory | G05D 16/109 239/206 |
| 2009/0108088 A1* | 4/2009 | Bredberg | B05B 3/0454 239/1 |
| 2010/0200674 A1* | 8/2010 | Everett | B05B 3/0422 239/222.11 |
| 2013/0126635 A1* | 5/2013 | Klinefelter | B05B 12/08 239/76 |

* cited by examiner

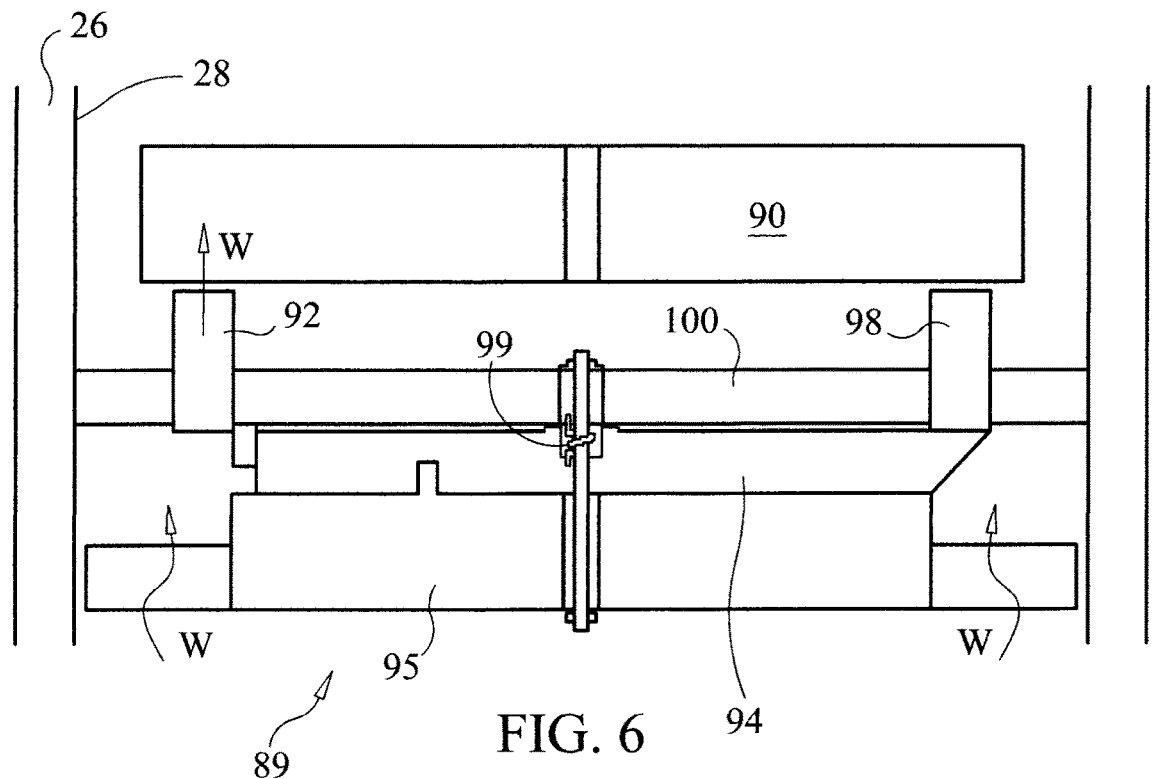
FIG. 6
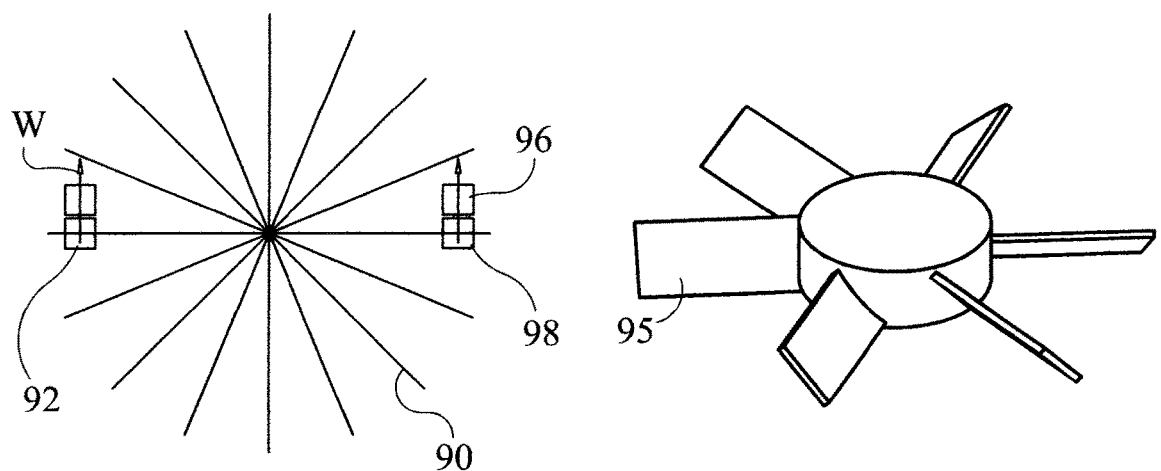
FIG. 7
FIG. 8

WATER SPRINKLER FOR SPRAYING A SELECT DEPTH OF WATER PER UNIT AREA ONTO ONE OR A GROUP OF GROUND AREAS OF ANY SHAPE AND RELATIVE SIZE

CROSS-REFERENCE

This application is a division of U.S. application Ser. No. 13/750,533, filed Jan. 25, 2013, which claims the benefit of the filing date priority of U.S. Provisional App. Ser. No. 61/591,081, filed Jan. 26, 2012. Both of these applications are incorporated herein by reference in their entirety.

BACKGROUND OF THE INVENTION

The present invention relates to in-ground water sprinklers and irrigation systems for residential and other landscaping installations, and particularly to providing highly efficient watering with (1) custom, geometrically accurate water coverage of irregular areas, avoiding wetting of paving and structures, and (2) laying down a uniform, controllable density of water coverage (inches per square foot) over each and all of the irregular areas being sprinkled, regardless of differences in area to be watered.

BACKGROUND OF THE ART

Residential and commercial watering systems have been devised which cover square and irregularly-shaped areas, but they can be difficult to adapt to particular installations. The most common irrigation devices still send water out in circular patterns or arcs thereof, requiring installation of many sprinkler heads and resulting in uneven application of water to the landscape, with some portions receiving for instance four times the water of other portions. Flat Plate Pattern Control U.S. Pat. No. 4,281,793, of DeWitt, disclosed a spray head with adjustable settings of flat plates about the periphery of the pattern for some on-site customization. Hose End Pattern Sprinkler U.S. Pat. No. 4,501,391 disclosed a plate fabricated with multiple alternate, selectable patterns for adaptation to several different yard layouts.

No known sprinkler system provides a simple, mechanical means for delivering a uniform density of water coverage to irregularly shaped areas of varying sizes.

SUMMARY OF THE INVENTION

The current invention gathers topological information about an irrigation spray area, for example a home lot to be irrigated, and solves for even water distribution over each of several partitioned areas of the lot in terms of compass angles, distances, any slopes, and input perimeters of water pressure and maximum flow rate. A water sprinkler system for such a defined area has custom plates made and installed in a relatively small number of vertical-axis sprinkler heads distributed about said area. Each plate has an open area formed about the center axis, that is generally congruent with the area to be sprayed from that head, adapted specifically to the periphery and to any slopes and obstacles in the area. This system provides uniform coverage of the area to be watered, rather than uneven coverage and waste as with conventional, arcuate area sprinkler heads.

According to the method of the invention, a known surveying tool, termed a "Total Station Instrument", is used to map significant features of the area to be irrigated and to determine, from inputs of water pressure and volume flow available, the shape of an opening to be cut into a pattern defining plate for each sprinkler head. Then the time for spraying each zone can be determined based on the water depth to be applied, taking into consideration the soil type and vegetation present. Because many fewer sprinkler heads are needed in this custom system, installation costs are greatly reduced compared with conventional systems, and water savings provide operating cost reductions and environmental advantages.

BRIEF DESCRIPTION OF THE DRAWINGS

FIG. 6 shows a flow activated speed control according to one facet of the present invention, including a pivoting cam that opens or blocks a slowing counter-flow of water against a turbine wheel that rotates the sprinkler head through a gear train (not shown).

FIG. 7 shows in plan view the upper turbine wheel with the motivating flows of water driving the gear train and thus controlling the speed of rotation of the sprinkler head.

FIG. 8 shows in perspective view a turbine wheel for biasing the speed control cam based on the variable flow of water through the sprinkler body.

THE PREFERRED EMBODIMENTS

A water sprinkler system is provided that is custom-matched to any regular or irregular lawn, garden, or other landscaped area, which may have obstructions such as paved areas, buildings, trees, and the like, so as to uniformly water the area with minimum installation costs and operating expenses. The system features a custom-made opening formed in a fixed pattern defining plate in each sprinkler head, the opening being mapped and oriented to the exact periphery of the area to be sprinkled, including adapting for slopes in the terrain. That opening is sampled by an aperture in a second, pattern sampling plate, which rotates in alignment with spray nozzles in the head to throw streams of water along a line from the sprinkler head position to the actual outer periphery of the area at each compass point of the rotation, as determined by the custom opening in the fixed pattern defining plate. A speed control in the sprinkler head causes the nozzles to slow their rotation while spraying portions of the area with longer water throws, so that more water is provided where greater areas (i.e., longer radii) are being watered, to provide uniformity of water coverage throughout the defined area.

Figure 1:
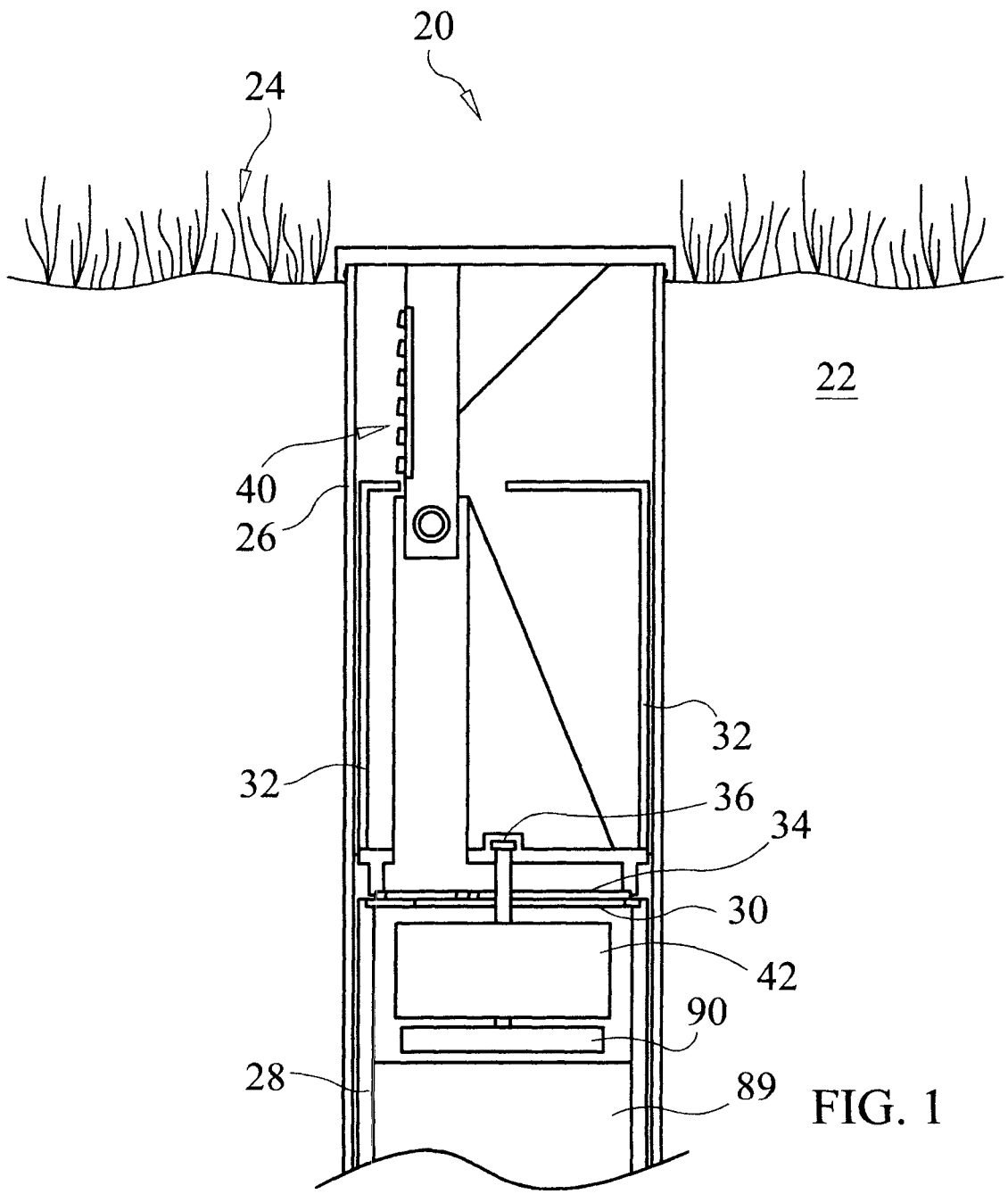
FIGS. 1 and 2 show vertical cross-sections of a sprinkler head of the present invention, in retracted and popped-up positions for storage and use, respectively.

FIG. 1 shows a spray head 20 in a retracted, inactive position as buried in ground 22 which is planted with grass 24 or other ground cover. A fixed outer housing 26 is set into the ground 22 and connected underground to a source of selectively pressurized water (not shown).

Figure 2:
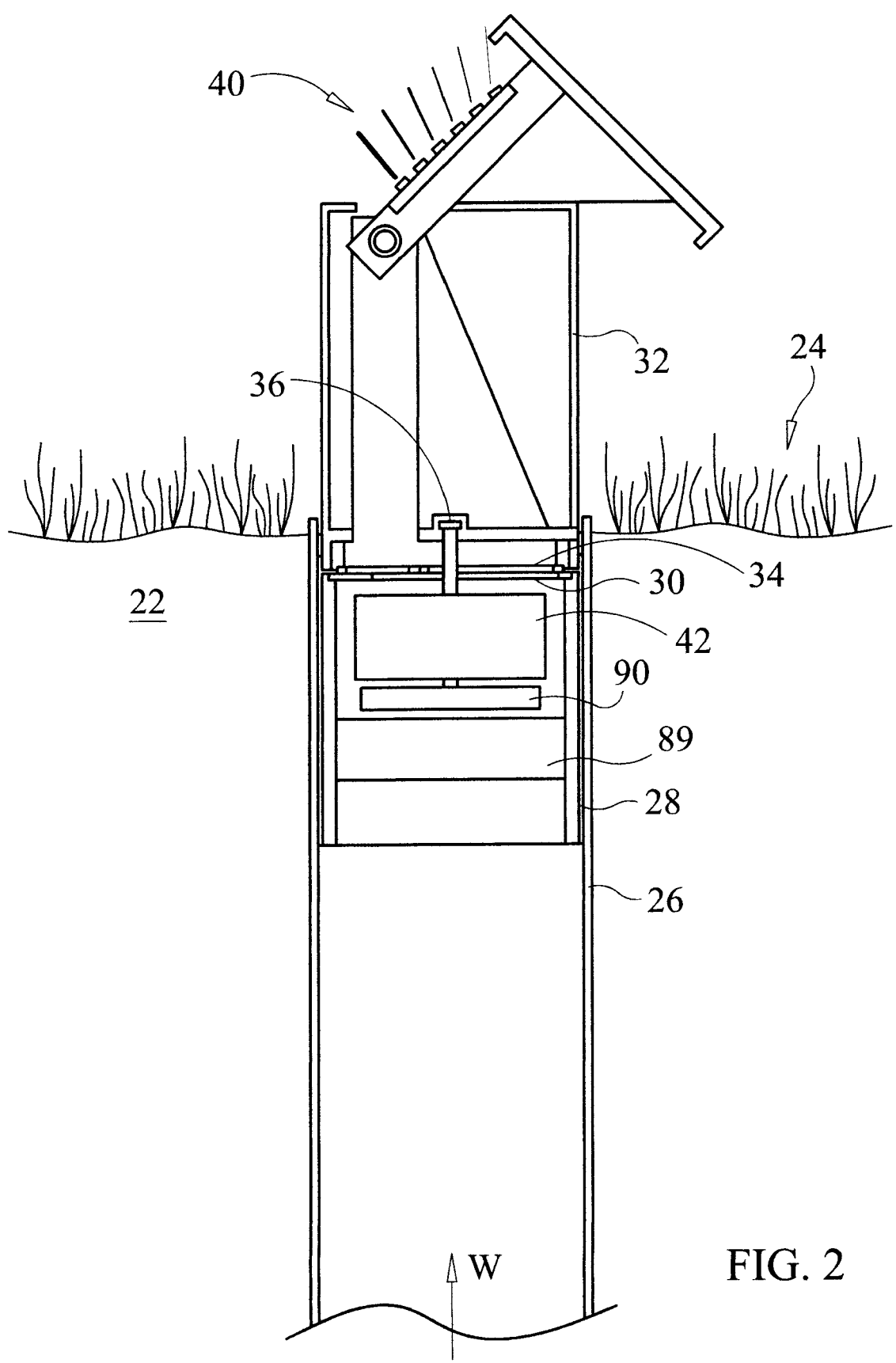

An inner housing 28 is set slideably but not rotatably within the housing 26, in water-tight connection thereto about their peripheral walls to avoid leakage, as is well known, for allowing the inner housing to pop up for use, as in FIG. 2. A custom-made pattern defining plate 30 is fixed in the inner housing 28 and with respect to the outer housing 26, being oriented there to the configuration of the lawn or landscaped area to be irrigated, as described below. An upper portion 32 of the inner housing 28 is set to rotate with respect to the outer and inner housings 26, 28, carried by a pattern sampling disk 34 and a gear train output assembly 36, which rotate together, driven by a turbine wheel turned by the flow of water through the system in operation, also as described below.

When irrigation water under pressure is introduced into the outer body 26, that body floods as in FIG. 2 and the water "pops up" the upper portion 32 of the inner housing 28 above the surface of the ground 22 and vegetation 24. A nozzle array 40 emerges from the outer housing 26 and is forced to a 45-degree angle atop the upper portion 32 by the jets of water shooting from the nozzles. The nozzles have bore sizes set for volume delivery proportional to the delivery radius squared, so water jets travelling farther have larger bores than those set for shorter throws. A pulse generator of any conventional structure (not shown), arranged in the inner housing 28, as below or upstream of the speed control 90 as below, causes the jets from the nozzles 40 to sputter slightly, evening out the water coverage along the line being watered from the sprinkler to the periphery of the area.

When the flow of water from the source is shut off, as at the end of a watering cycle, a pushdown spring (not shown) causes the inner housing 28 and upper body 32 to retract into the outer body 26; the nozzle array 40 is guided to a vertical position, as in FIG. 1, upon such retraction. The spray head and water supply system may be drained, or water in the system blown out with high pressure air, for protection from freezing temperatures.

Figure 3:
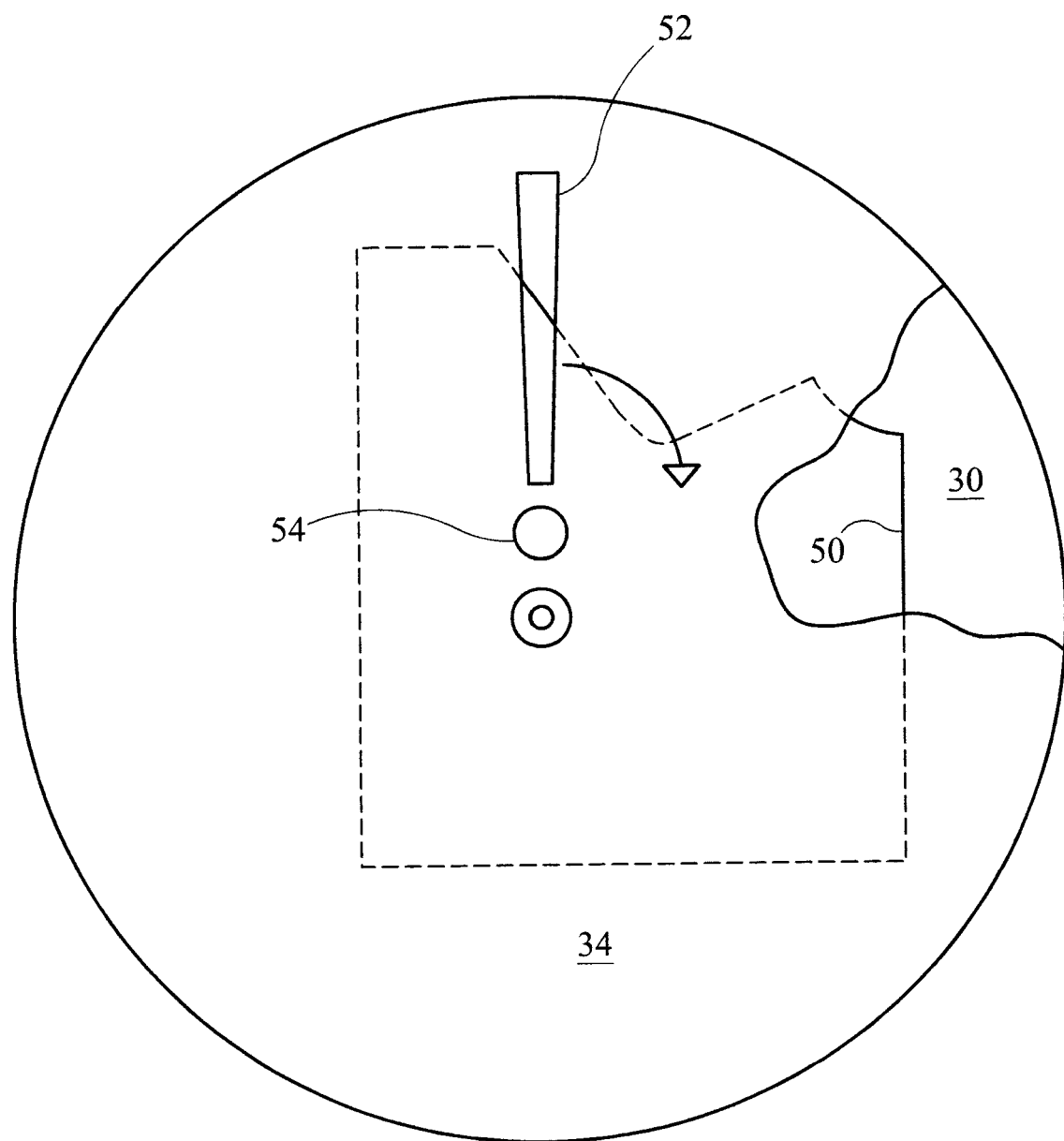
FIG. 3 shows a fixed, sample custom flat plate with a rotating sampling aperture thereon, as provided in a sprinkler head, according to the present invention.

The custom pattern defining plate 30, as in FIG. 3, is cut with a pattern defining aperture 50 adapted to the area and terrain to be irrigated. This aperture 50 will generally be congruent to the area to be watered, but with adjustments for elevated areas (corresponding radii enlarged) and for depressed areas (corresponding radii reduced) to adjust the distance of water throw as compared to entirely flat areas. As in FIG. 3, a pattern sampling aperture 52 is formed in the upper, rotating pattern sampling plate 34, extending from near the axial center of the sprinkler head to a maximum radius for water throw to the farthest periphery of the area to be irrigated. For strength of the sampling plate 34, the innermost portion of the sampling aperture is preferably replaced with a minimum flow aperture 54 of corresponding flow area, which is always unobstructed by the pattern defining plate 30 and the aperture 50 therein. The pattern defining plate 30 is fixed in the sprinkler inner and outer bodies 28, 26, with respect to the land area to be watered, while the pattern sampling plate 34 and pattern sampling aperture 52 rotate with the nozzle array 40.

The pattern defining plate 30 is custom prepared for the land and particular zone of a water sprinkling system for which it is adapted. An automated device such as a Total Station Instrument, by any of a number of makers of such survey instruments, is used by a qualified surveyor from as few as two setup points in the landscape to be irrigated. The Total Station Instrument can shoot a typical lot in just minutes, including the corner points of the lot, house, driveway, etc., and the location of all obstacles such as trees, tall bushes, entrance stoops, patios, underground utilities, etc.

Figure 4:
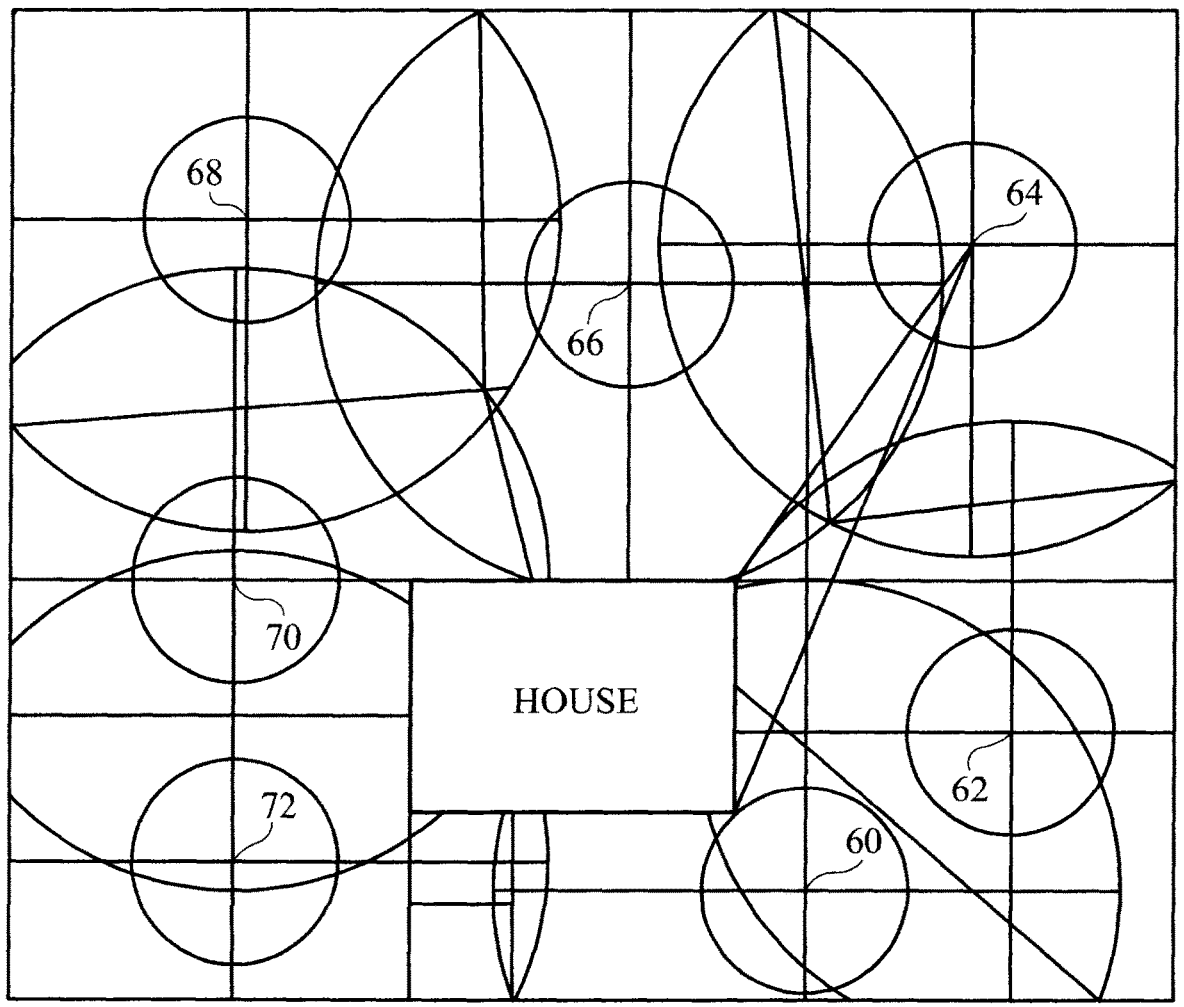
FIG. 4 shows a plot of a layout of a customized sprinkler system for a large lot with seven sprinkler zones in two groupings to handle coverage around a house and driveway, as determined by a central computer program used in the method of the invention.

Layout of the entire sprinkler system, as in FIG. 4, would include partitioning of the lot into zones for separate sprinkler heads. This can be done manually but preferably is done automatically by a central computer program, dependent on water pressure and water volume available. This layout would include specifying the most efficient locations for sprinkler heads in terms of the minimum and maximum ranges of the sprinklers, and the slopes, if any, in the terrain measured. A typical installation layout is indicated in FIG. 4, where key shots of the lot, home, obstacles, etc. are taken with any available Total Station Instrument and transmitted to a central computer for analysis and design of the sprinkler layout. For the large lot shown, seven zones are suggested by the system, with installation points indicated for seven sprinkler heads and dividing the zones into two groups about the house and driveway for best use of the available pressure and volume of water flows available. Each zone is arranged so as to leave no unwatered places in the lawn while also avoiding wetting the house and driveway. Thus a sprinkler head for Zone 1 would be installed at point 60, for watering the front yard and up to part of the side of the house; a Zone 2 sprinkler head would be installed at point 62, that for Zone 3 at 64, and that for Zone 4 at 66. Because of the size of the lot of FIG. 4, a second set of watering zones is required to avoid loss of water pressure and volume in the watering process; zones 5, 6, and 7 to the west of the house are set up similarly by the central computer for installation of sprinkler heads at positions 68, 70, and 72, respectively. This second set of zones would be watered after watering of zones 1-4 is completed.

Figure 5:
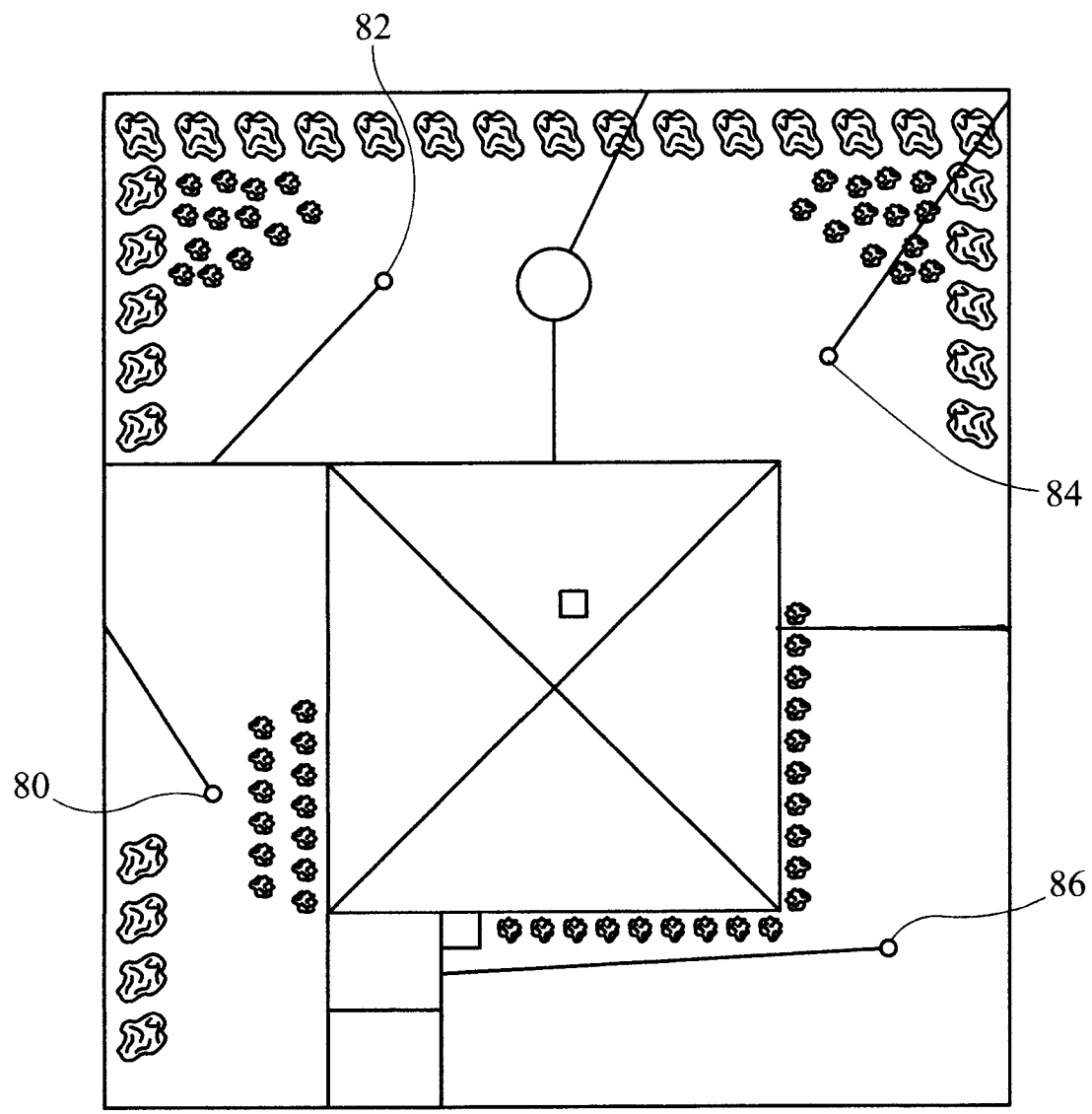
FIG. 5 shows a plot of a layout of a second embodiment of the present invention as applied to a smaller lot with four zones about a house and driveway with a tree and shrubbery.

FIG. 5 shows a smaller lot about a house, where the lot needs only four zones for watering all of the yard. The Total Station instrument similarly is used to define the boundaries and obstructions needed for planning, and the locations of four sprinkler heads, 80, 82, 84, and 86 are determined. No overlap of circular spray areas is provided, with the uneven coverage that the older systems provide.

In this method of FIGS. 4 and 5, triangulation off the house or other points in the original shooting locates a preferred installation point for each sprinkler, for the feed lines, etc. The only tools necessary are the Triangulation Map as in FIG. 4 and a tape rule, for identifying the sprinkler head locations.

In most cases for average-sized lots, a Customized System might include one pressure regulator, three or four sprinklers, a matching number of control valves, rain and moisture sensors, etc., for optimum usage.

FIGS. 6 to 11 show internal arrangement and workings of rotation drive controls for the sprinkler heads, including particularly a speed control that is flow actuated. An upper turbine wheel 90 is rotated by a flow of water through a port 92, which is always open. The turbine 90 drives the gear train 42, in FIGS. 1 and 2, and also rotates the upper, pattern sampling plate 34 together with the spray nozzles 40 in the upper body 32.

Speed control of rotation of the nozzle array 40 is effected by a radially contoured cam 94 that selectively blocks and opens a countervailing flow 96 of water via port 98 onto the turbine wheel 90 for slowing the turbine's rotation and thus also the speed of the connected drive train 42. The pivotal position of the cam 94 is determined by a clockwise pivoting force of the water flow on a lower turbine wheel 95 acting in opposition to a counterclockwise force of a torsional spring 99 acting between the cam 94 and a nozzle plate 100 that is fixed in the inner body 28 of the sprinkler. This arrangement causes the cam plate 94 to pivot clockwise as in FIG. 10 when the flow of water W through the sprinkler is greatest and to return to its counterclockwise position of FIG. 9 when such flow W is at a minimum, corresponding to greatest and least flow volumes and thus to slowest and fastest rotation of the spray head 40. That is, where the water throw is the greatest, i.e., for sprinkling out to peripheries that are farthest from the sprinkler head, the rotation is slowest, and vice versa.

Figure 9:
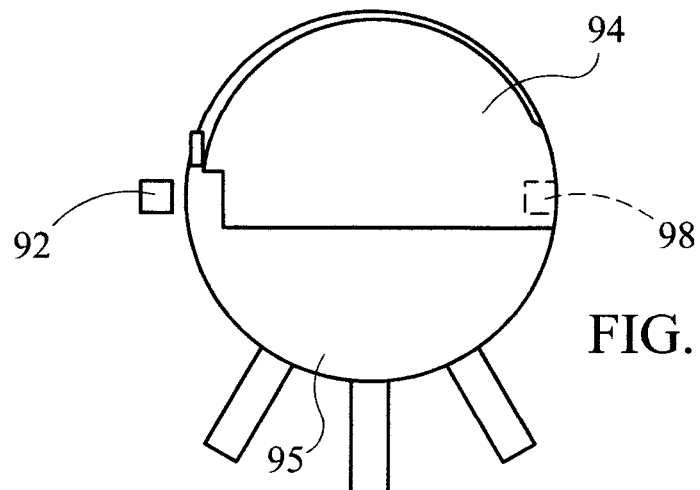
FIGS. 9, 10, and 11 show in plan view three of the positions of the pivoting cam in the speed control device of the invention.
Figure 10:
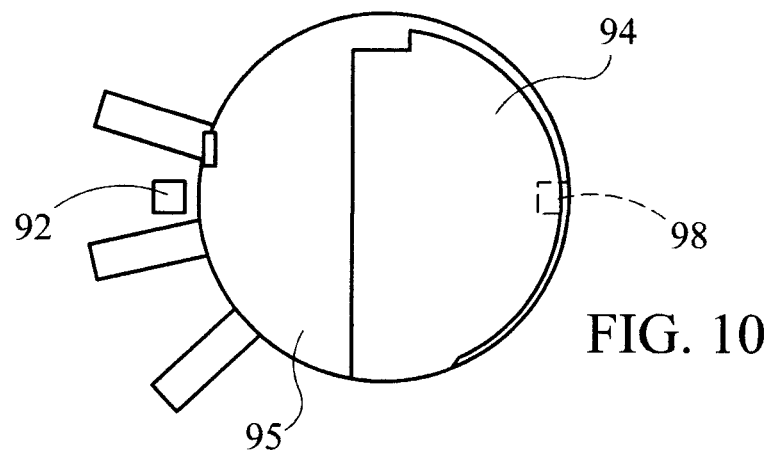

At the minimum spraying radius, the nozzle 98 on the right in FIGS. 6 and 9-11 will be substantially blocked from flow as shown in FIGS. 6 and 9. As the water throw and thus flow volume increase, the cam 94 shifts clockwise toward the FIG. 9 position under the force of the water flow on the vanes of the lower turbine wheel 95, opening flow through the right-hand port 98 and slowing rotation of the upper turbine 90 and thus slowing rotation of the upper body 32 and the spray nozzles 40.

Figure 11:
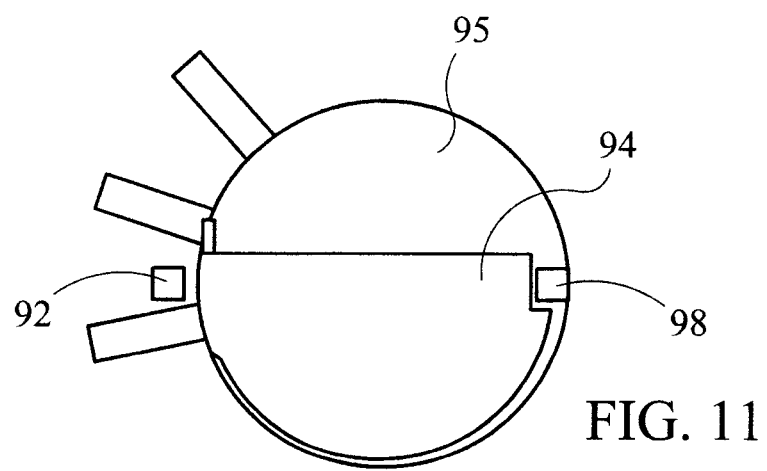

The cam 94 will pivot to the FIG. 11 position only upon extreme conditions of water or air pressure and flow, as when the system is being blown through with air to clear water from the sprinkler heads, as, to winterize the system, and then the turbine 90 will stop rotating until the blowing stops and water is again introduced under pressure.

Many variations may be made in the invention as shown and its manner of use, without departing from the principles of the invention as described herein and/or as claimed as our invention. Minor variations will not avoid use of the invention.

I claim:

1. A sprinkler comprising:
an outer housing;
a lower inner housing disposed in, slidably engaged with, and rotationally fixed relative to the outer housing;
a pattern defining plate disposed in the lower inner housing, the pattern defining plate defining a pattern defining aperture comprising an aperture perimeter that corresponds to an area to be sprinkled, the aperture perimeter comprising at least a first radius corresponding to a first water throw distance for an elevated portion of the area to be sprinkled, and a second radius corresponding to a second water throw distance for a depressed portion of the area to be sprinkled, wherein the first radius is larger than the second radius;
an upper inner housing at least partially disposed in and slidably engaged with the outer housing and rotatable relative to the lower inner housing;
a pattern sampling plate disposed in the upper inner housing, the pattern sampling plate defining a sampling aperture; and
a speed control disposed in the lower inner housing and engaged with the upper inner housing to rotate the upper inner housing relative to the lower inner housing, the speed control being upstream and independent of the pattern defining plate and the pattern sampling plate.

2. The sprinkler of claim 1, further comprising a nozzle array pivotably engaged with the upper inner housing.

3. The sprinkler of claim 2, wherein the nozzle array includes a plurality of nozzles having differing bore sizes.

4. The sprinkler of claim 1, wherein the pattern sampling plate defines a minimum flow aperture.

5. The sprinkler of claim 1, wherein the speed control comprises:
an upper turbine wheel drivingly connected to the upper inner housing;
a first nozzle supported by the lower inner housing and directed toward the upper turbine wheel;
a second nozzle supported by the lower inner housing and directed toward the upper turbine wheel;
a radially contoured cam supported by the lower inner housing to selectively block fluid flow to the second nozzle; and
a lower turbine wheel supported by the lower inner housing and drivingly connected to the radially contoured cam.

6. The sprinkler of claim 5, wherein the lower turbine wheel turns in a first direction when fluid flows upwardly through the outer housing and the sprinkler further comprises a spring to urge the radially contoured cam in a second direction opposite the first direction.

7. The sprinkler of claim 5, wherein the upper turbine wheel is drivingly connected to the upper inner housing via a reduction gear train.

8. A sprinkler system comprising:
one or more sprinklers, each of the one or more sprinklers comprising:
an outer housing;
a lower inner housing disposed in, slidably engaged with, and rotationally fixed relative to the outer housing;
a pattern defining plate disposed in the lower inner housing, the pattern defining plate defining a pattern defining aperture comprising an aperture perimeter that corresponds to an area to be sprinkled, the aperture perimeter comprising at least a first radius corresponding to a first water throw distance for an elevated portion of the area to be sprinkled, and a second radius corresponding to a second water throw distance for a depressed portion of the area to be sprinkled, wherein the first radius is larger than the second radius;
an upper inner housing at least partially disposed in and slidably engaged with the outer housing and rotatable relative to the lower inner housing;
a pattern sampling plate disposed in the upper inner housing, the pattern sampling plate defining a sampling aperture; and
a speed control disposed in the lower inner housing and engaged with the upper inner housing to rotate the upper inner housing relative to the lower inner housing, the speed control being upstream and independent of the pattern defining plate and the pattern sampling plate; and
a pressure regulator in fluid communication with the one or more sprinklers to deliver water to the outer housing at a predetermined pressure.

9. The sprinkler system of claim 8, wherein the one or more sprinklers are pop-up type sprinklers configured to be installed at least partially underground.

10. The sprinkler system of claim 8, wherein each of the one or more sprinklers is in fluid communication with and is controlled via a control valve.

11. The sprinkler system of claim 8, further comprising a moisture sensor to generate moisture data, wherein the pressure regulator supplies water to the one or more sprinklers based on the moisture data.

12. The sprinkler system of claim 8, wherein the pattern defining plate is configured to provide non-circular sprinkling coverage to the area to be sprinkled.

13. The sprinkler system of claim 12, wherein sprinkling coverages of neighboring sprinklers do not overlap.

14. The sprinkler system of claim 12, wherein the area to be sprinkled has a perimeter shape and the pattern defining plate is oriented relative to the area to be sprinkled such that the pattern defining aperture is aligned with the perimeter shape.

15. The sprinkler system of claim 8, wherein the area to be sprinkled has a perimeter shape and the speed control is adapted to modulate a rotation speed of the upper inner housing based on the perimeter shape.

16. A sprinkler comprising:
an outer housing;
a lower inner housing disposed in, slidably engaged with, and rotationally fixed relative to the outer housing;
a pattern defining plate disposed in the lower inner housing, the pattern defining plate defining a pattern defining aperture corresponding to an area to be sprinkled;
an upper inner housing at least partially disposed in and slidably engaged with the outer housing and rotatable relative to the lower inner housing;
a pattern sampling plate disposed in the upper inner housing, the pattern sampling plate defining a sampling aperture; and
a speed control disposed in the lower inner housing and engaged with the upper inner housing to rotate the upper inner housing relative to the lower inner housing, the speed control being upstream and independent of the pattern defining plate and the pattern sampling plate and the speed control comprising:
an upper turbine wheel drivingly connected to the upper inner housing,
a first nozzle supported by the lower inner housing and directed toward the upper turbine wheel,
a second nozzle supported by the lower inner housing and directed toward the upper turbine wheel,
a radially contoured cam supported by the lower inner housing to selectively block fluid flow to the second nozzle, and
a lower turbine wheel supported by the lower inner housing and drivingly connected to the radially contoured cam.

17. The sprinkler of claim 16, further comprising a nozzle array pivotably engaged with the upper inner housing, wherein the nozzle array includes a plurality of nozzles having differing bore sizes.

18. The sprinkler of claim 16, wherein the pattern sampling plate defines a minimum flow aperture.

19. The sprinkler of claim 16, wherein the lower turbine wheel turns in a first direction when fluid flows upwardly through the outer housing and the sprinkler further comprises a spring to urge the radially contoured cam in a second direction opposite the first direction.

20. The sprinkler of claim 16, wherein the upper turbine wheel is drivingly connected to the upper inner housing via a reduction gear train.

* * * * *